US010702980B2

(12) United States Patent
Pomeroy et al.

(10) Patent No.: US 10,702,980 B2
(45) Date of Patent: Jul. 7, 2020

(54) GAS SPRING FASTENER DRIVER

(71) Applicant: TTI (MACAO COMMERCIAL OFFSHORE) LIMITED, Macau (MO)

(72) Inventors: Edward Pomeroy, Piedmont, SC (US); Zachary Scott, Easley, SC (US); John Schnell, Anderson, SC (US); Essam Namouz, Greenville, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 153 days.

(21) Appl. No.: 15/807,724

(22) Filed: Nov. 9, 2017

(65) Prior Publication Data

US 2018/0126529 A1    May 10, 2018

Related U.S. Application Data

(60) Provisional application No. 62/419,719, filed on Nov. 9, 2016.

(51) Int. Cl.
*B25C 1/04* (2006.01)
*B25C 1/00* (2006.01)
*B25C 1/06* (2006.01)

(52) U.S. Cl.
CPC ............ *B25C 1/047* (2013.01); *B25C 1/008* (2013.01); *B25C 1/06* (2013.01)

(58) Field of Classification Search
CPC . B25C 1/06; B25C 1/008; B25C 1/047; B27F 7/11; B27F 7/36; A43D 5/12
USPC .............................................. 227/8, 120–128
See application file for complete search history.

(56) References Cited

U.S. PATENT DOCUMENTS

| 8,302,832 | B2 * | 11/2012 | Porth | ...................... | B25C 1/003 227/120 |
| 2003/0034377 | A1 * | 2/2003 | Porth | ...................... | B25C 1/003 227/10 |
| 2010/0224666 | A1 * | 9/2010 | Miyata | ...................... | B25C 1/08 227/9 |

(Continued)

FOREIGN PATENT DOCUMENTS

| EP | 0123716 | 11/1984 |
| EP | 1755836 | 12/2009 |

(Continued)

OTHER PUBLICATIONS

European Patent Office Search Report for Application No. 17200840 dated Jun. 22, 2018, 12 pages.

*Primary Examiner* — Chelsea E Stinson
*Assistant Examiner* — Himchan "Aiden" Song
(74) *Attorney, Agent, or Firm* — Michael Best & Friedrich LLP

(57) ABSTRACT

A fastener driver includes a housing, a cylinder disposed within the housing, a piston positioned and movable within the cylinder, a driver blade attached to the piston and movable with the piston, a motor for driving movement of the piston, a battery removably coupled to the housing for supplying power tot the motor, a nosepiece at least partially defining a fastener driving track through which fasteners are driven by the driver blade, and a magazine operable to supply the fasteners to the nosepiece. The magazine is removable from the nosepiece only in response to prior removal of the battery from the housing.

18 Claims, 5 Drawing Sheets

(56) References Cited

U.S. PATENT DOCUMENTS

2012/0228354 A1* 9/2012 Schwartzenberger .. B25C 1/188
  227/109
2013/0320067 A1* 12/2013 Gregory .................... B25C 1/00
  227/139
2017/0066116 A1* 3/2017 Garber ...................... B25C 1/06

FOREIGN PATENT DOCUMENTS

| EP | 2193884 | 6/2010 |
| EP | 2489475 | 8/2012 |
| JP | 2005001065 | 1/2005 |
| JP | 2011000689 | 1/2011 |
| WO | 2008117880 | 10/2008 |

* cited by examiner

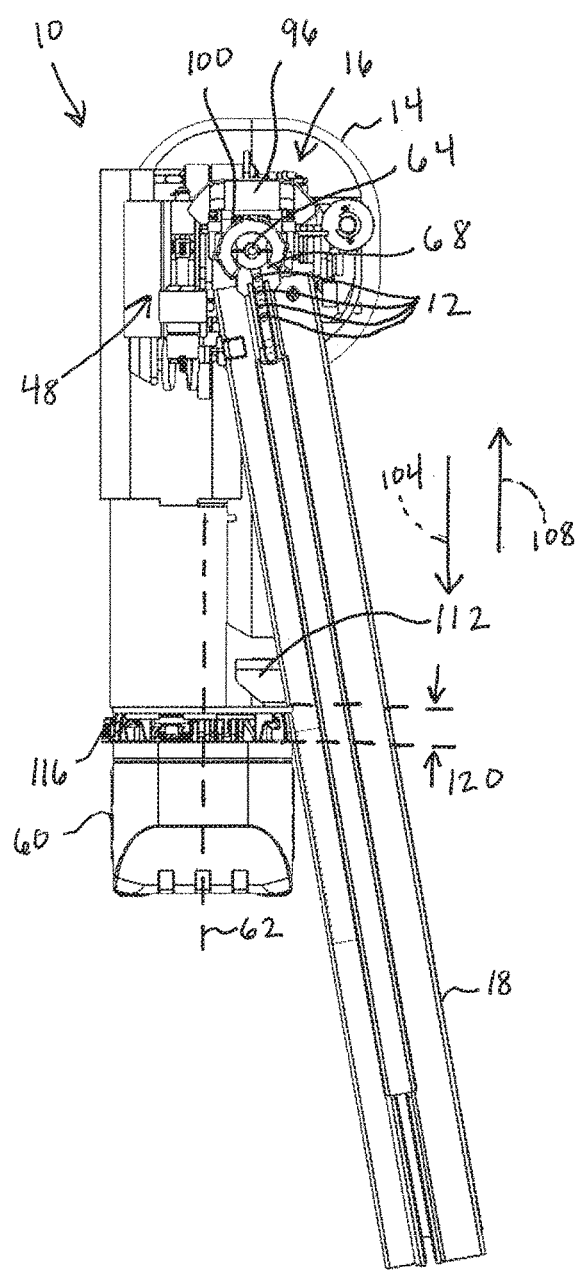
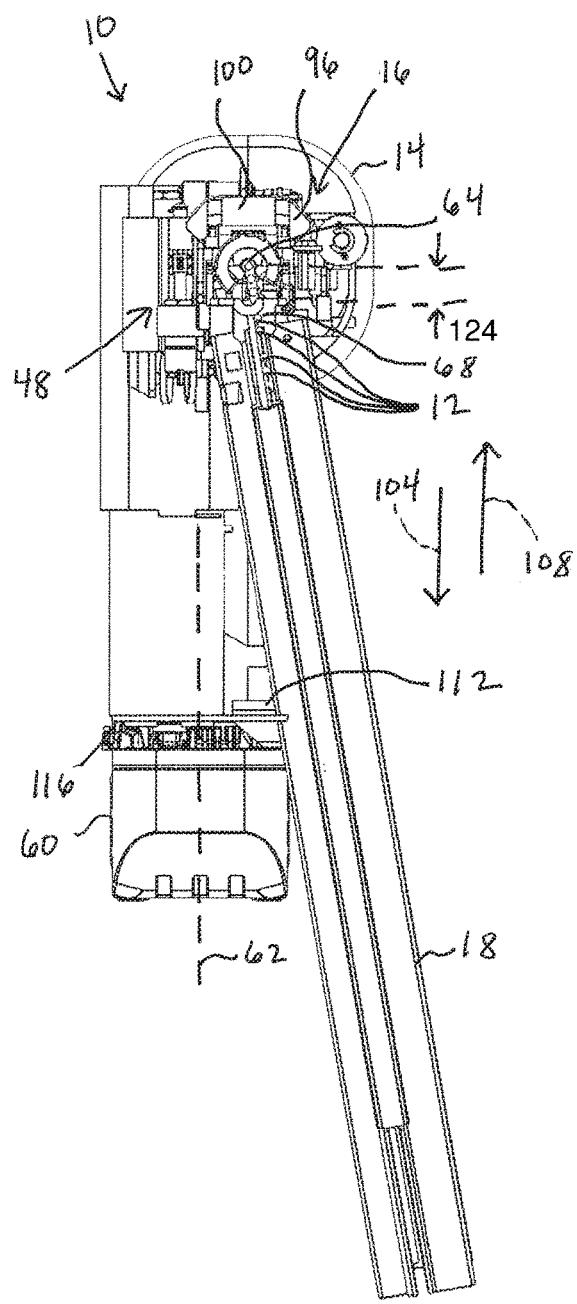
FIG. 5
FIG. 6

GAS SPRING FASTENER DRIVER

CROSS-REFERENCE TO RELATED APPLICATIONS

This application claims priority to U.S. Provisional Patent Application No. 62/419,719 filed on Nov. 9, 2016, the entire content of which is incorporated herein by reference.

FIELD OF THE INVENTION

The present invention relates to power tools, and more particularly to gas spring fastener drivers.

BACKGROUND OF THE INVENTION

There are various fastener drivers used to drive fasteners (e.g., nails, tacks, staples, etc.) into a workpiece known in the art. These fastener drivers operate utilizing various means (e.g., compressed air generated by an air compressor, electrical energy, flywheel mechanisms) known in the art, but often these designs are met with power, size, and cost constraints.

SUMMARY OF THE INVENTION

The present invention provides, in one aspect, a fastener driver including a housing, a cylinder disposed within the housing, a piston positioned and movable within the cylinder, a driver blade attached to the piston and movable with the piston, a motor for driving movement of the piston, a battery removably coupled to the housing for supplying power to the motor, a nosepiece at least partially defining a fastener driving track through which fasteners are driven by the driver blade, and a magazine operable to supply the fasteners to the nosepiece. The magazine is removable from the nosepiece only in response to prior removal of the battery from the housing.

The present invention provides, in another aspect, a fastener driver including a cylinder, a piston positioned and moveable within the cylinder, a driver blade attached to the piston and moveable with the piston, a front nosepiece at least partially defining a fastener driving track through which fasteners are driven by the driver blade, a rear nosepiece at least partially defining the fastener driving track, and a magazine attached to the rear nosepiece and operable to supply the fasteners to the fastener driver track through the rear nosepiece. The rear nosepiece and the magazine are removably coupled to the front nosepiece as a unit.

The present invention provides, in yet another aspect, a method of operating a fastener driver. The method includes initiating a fastener driving operation by moving a driver blade, with a gas spring mechanism, from a retracted position toward a driven position, stopping the driver blade at an intermediate position between the retracted position and the driven position in response to a fastener jammed in a fastener driving track defined between a front nosepiece and a rear nosepiece of the fastener driver, detaching a battery from the fastener driver, and removing the magazine and the rear nosepiece as a unit from the front nosepiece, after the battery has been removed.

Other features and aspects of the invention will become apparent by consideration of the following detailed description and accompanying drawings.

BRIEF DESCRIPTION OF THE DRAWINGS

FIG. 5 is a bottom view of the gas spring fastener driver of FIG. 1, illustrating the magazine in the engaged position.

FIG. 6 is a bottom view of the gas spring fastener driver of FIG. 1, illustrating the magazine in the disengaged position with a blocking member abutting a battery of the fastener driver.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
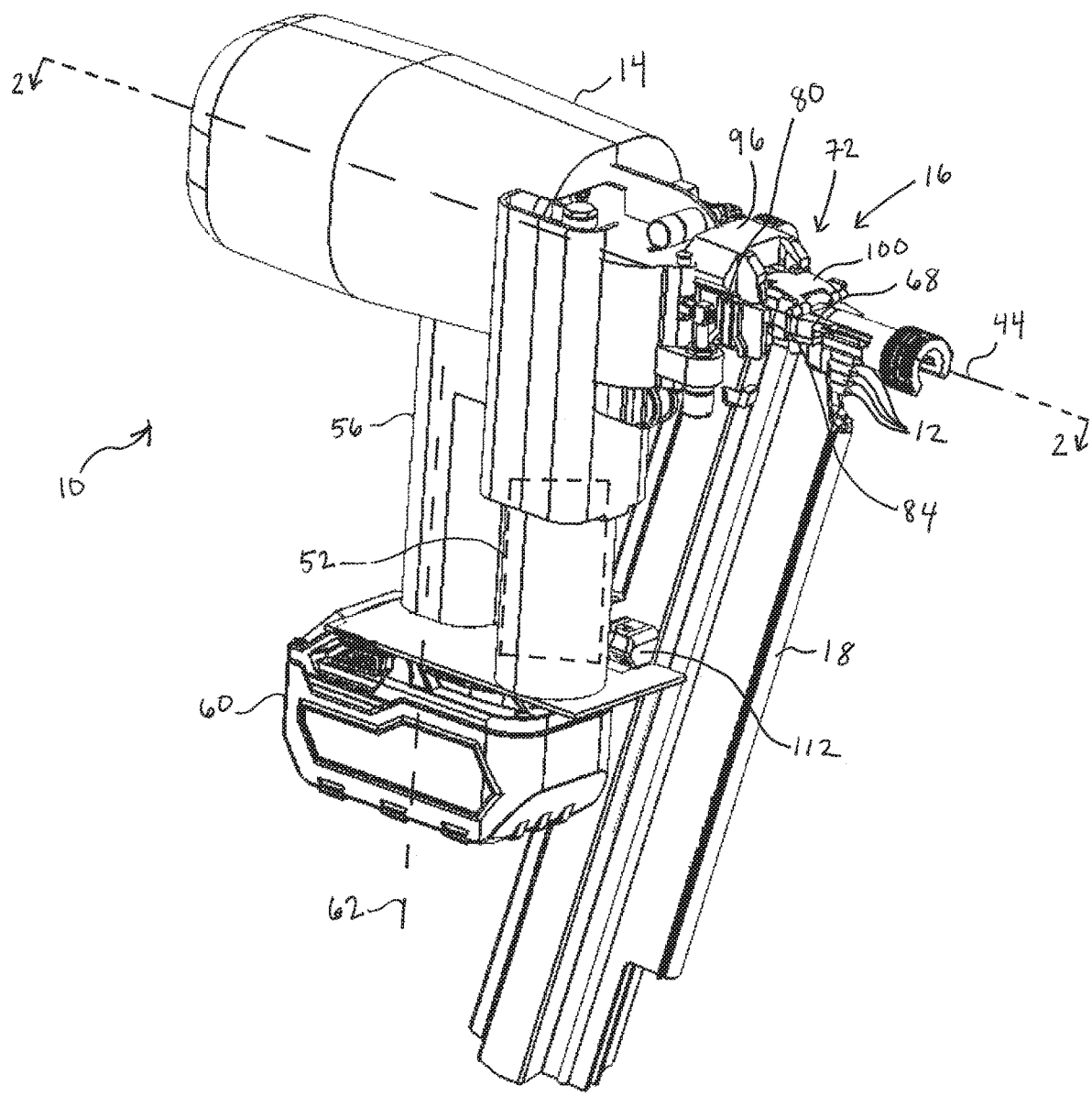
FIG. 1 is a front perspective view of a gas spring fastener driver in accordance with an embodiment of the invention.
Figure 2:
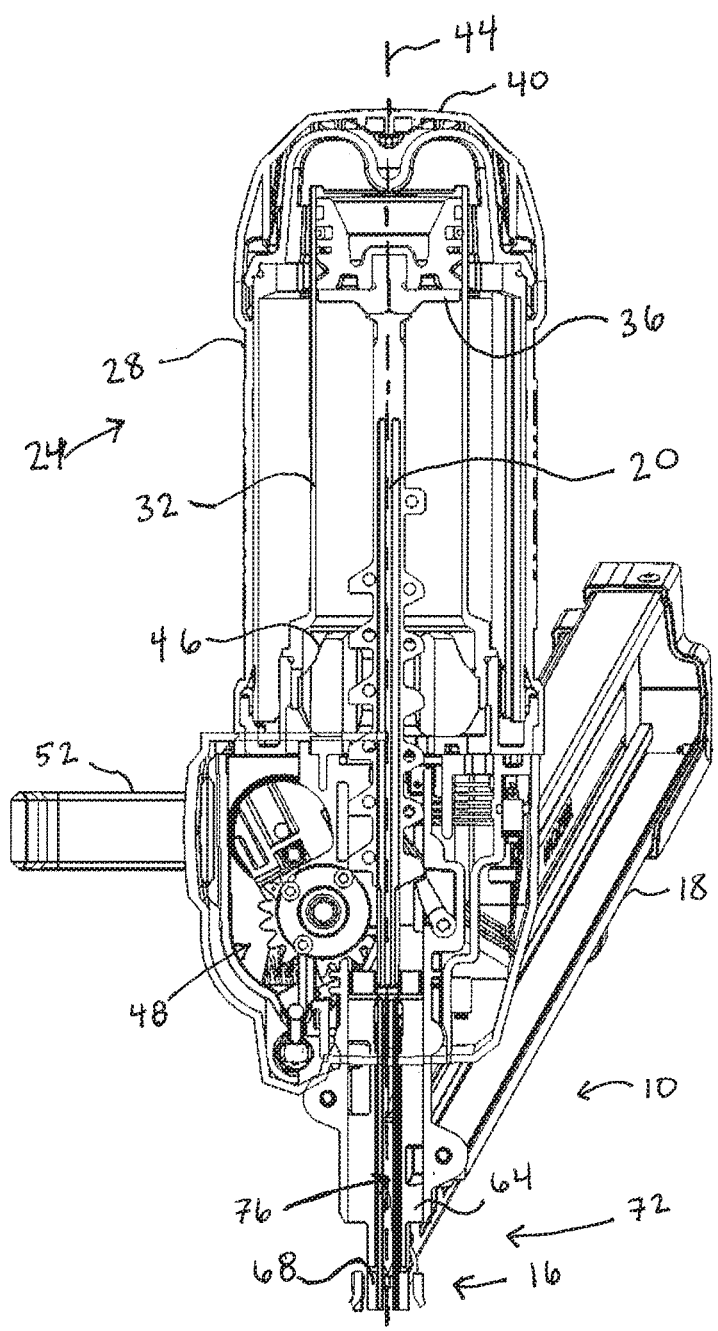
FIG. 2 is a cross sectional view of the gas spring fastener driver along line 2-2 of FIG. 1.

With reference to FIGS. 1 and 2, a gas spring fastener driver 10 for driving fasteners 12 (e.g., nails, tacks, staples, etc.) into a workpiece is shown. The fastener driver 10 includes a housing 14, a nosepiece 16 extending from the main housing 14, and a magazine 18 for sequentially feeding fasteners 12 (e.g., collated fasteners) into the nosepiece 16 prior to each fastener-driving operation. Although the magazine 18 of the illustrated embodiment is composed of a magnesium material, in other embodiments, the magazine 18 can alternatively be composed of a different metal or metal alloy, or other suitable materials.

As shown in FIG. 2, the fastener driver 10 also includes a drive blade 20 and an onboard gas spring mechanism 24 for driving the drive blade 20 coinciding with ejection of a fastener 12 from the nosepiece 16. Accordingly, the fastener driver 10 does not require an external source of air pressure for driving the drive blade 20. Rather, the gas spring mechanism 24 includes a storage chamber 28 of pressurized gas in fluid communication with a cylinder 32. The cylinder 32 and a moveable piston 36 are positioned within the storage chamber 28.

With reference to FIG. 2, the cylinder 32 and the drive blade 20 define a driving axis 44, and during a driving cycle the drive blade 20 and the piston 36 are moveable along the driving axis 44 between a ready position (i.e., top dead center; see FIG. 2) and a driven position (i.e., bottom dead center). In the driven position, the piston 36 is abutted by a bumper 46 to stop further movement of the piston 36. The fastener driver 10 further includes a lifting assembly 48, which is powered by a motor 52, and which is operable to move the drive blade 20 from the driven position to the ready position. The drive blade 20 is biased to the driven position by compressed gas in the storage chamber 28. With reference to FIG. 1, the fastener driver 10 further includes a handle 56 that is grasped by an operator for maneuvering the fastener driver 10. The handle 56 and the motor 52 are both oriented substantially perpendicular to the driving axis 44. Also, the fastener driver 10 includes a battery 60 that is removably coupled to the handle 56 along a battery insertion/removal axis 62 that is also perpendicular to the driving axis 44. The battery 60 is electrically connectable to the motor 52 for supplying electrical power to the motor 52 to drive the lifting assembly 48.

In operation, the lifting assembly 48 (FIG. 2) raises the piston 36 and the drive blade 20 from the driven position and toward the ready position by energizing the motor 52. As the piston 36 and the drive blade 20 are moved to the ready position, the gas above the piston 36 and the gas within the storage chamber 28 is compressed. Once in the ready position, the piston 36 and the drive blade 20 are held in position until released by user activation of a trigger (not shown). When released, the compressed gas above the piston 36 and within the storage chamber 28 drives the piston 36 and the drive blade 20 to the driven position, thereby driving a fastener into a workpiece. The illustrated fastener driver 10 therefore operates on a gas spring principle utilizing the lifting assembly 48 and the piston 36 to further compress the gas within the cylinder 32 and the storage chamber 28. Further detail regarding the structure and operation of the fastener driver 10 is provided below.

Figure 3:
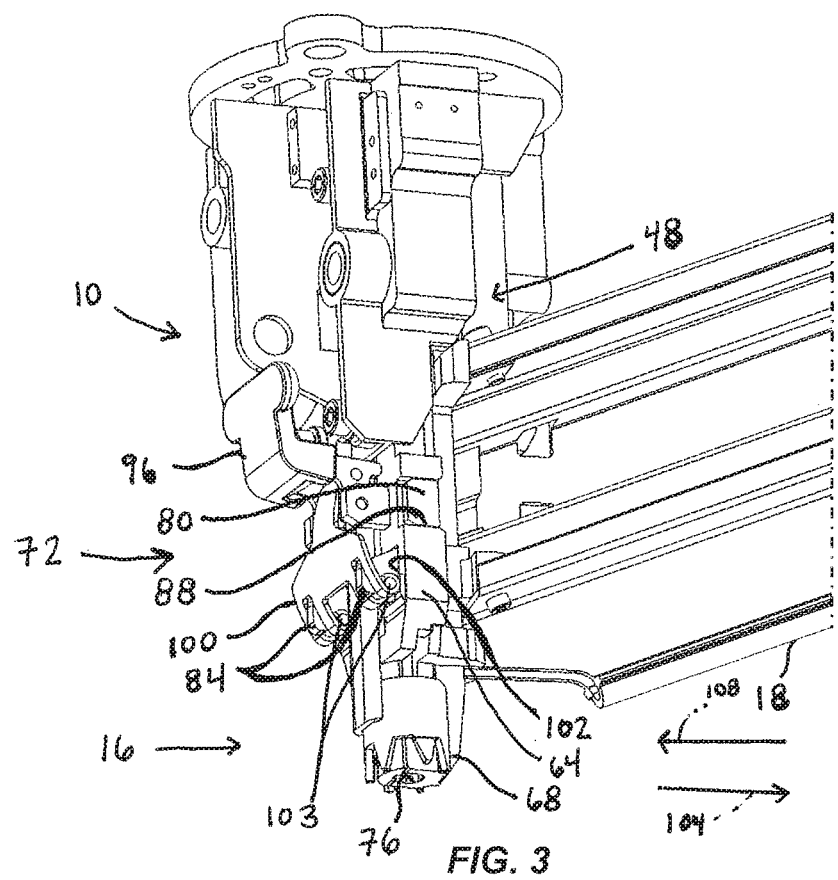
FIG. 3 is an enlarged perspective view of a portion of the gas spring fastener driver of FIG. 1, illustrating a magazine in an engaged position with a nosepiece of the fastener driver.
Figure 4:
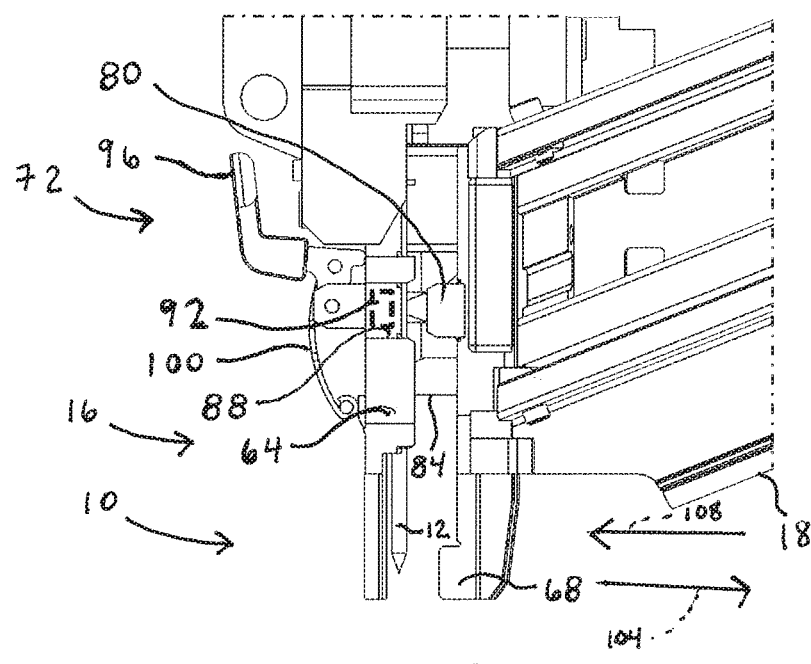
FIG. 4 is a side view of the portion of the gas spring fastener driver of FIG. 3, illustrating the magazine in a disengaged position from the nosepiece of the fastener driver.
Figure 7:
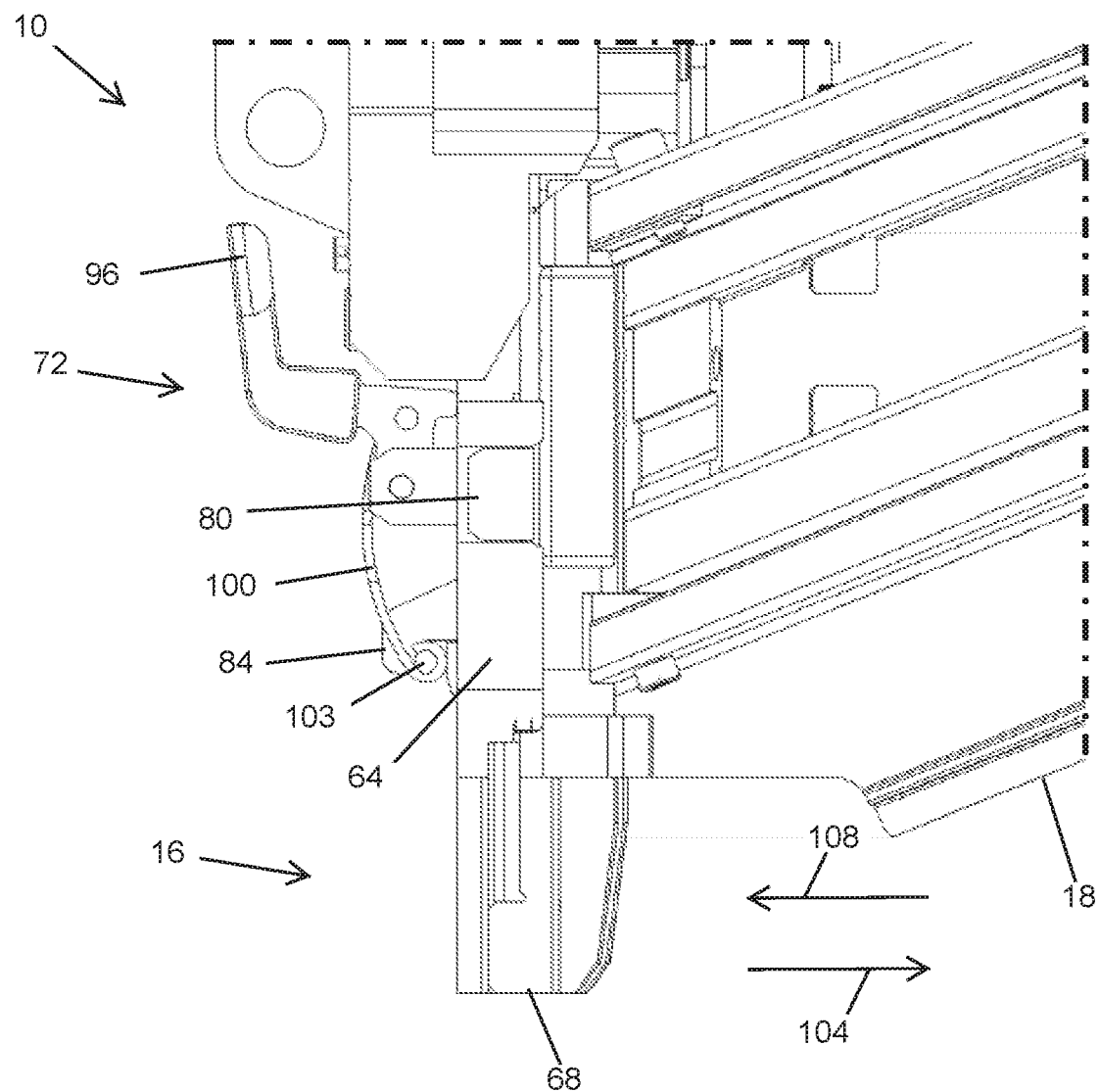
FIG. 7 is a side view of the portion of the gas spring fastener driver of FIG. 3, illustrating the magazine in the engaged position from the nosepiece of the fastener driver.

With reference to FIGS. 3, 4, and 7, the nosepiece 16 further includes a front nosepiece 64, a rear nosepiece 68, and an over-center spring latch 72 (i.e., a quick-release latch) operable to secure the rear nosepiece 68 to the front nosepiece 64. Because the magazine 18 is attached or otherwise unitized with the rear nosepiece 68, attaching the rear nosepiece 68 to the front nosepiece 64 also attaches the magazine 18 to the front nosepiece 64. Also, when the front and rear nosepieces 64, 68 are interconnected, a fastener driving track or channel 76 is formed therebetween (FIG. 3). The fastener driving track 76 is coaxial with the driving axis 44 and is in communication with the magazine 18 in order to sequentially receive the fasteners 12 from the magazine 18 for consecutive fastener driving operations. As illustrated in FIG. 3, the rear nosepiece 68 includes a first pair of projections 80 and a second pair of hooks or projections 84, both of which extend away from the rear nosepiece 68 toward the front nosepiece 64, positioned on opposite sides of the fastener driving track 76. The first pair of projections 80 extend into corresponding slots 88 defined in the front nosepiece 64. Within at least one of the slots 88 is positioned an electrical switch 92 (e.g., a microswitch, FIG. 4) that is operable to detect when the projections 80 are received within the respective slots 88. Accordingly, the electrical switch 92 is operable to detect when the rear nosepiece 68 is removed from the front nosepiece 64, and when the rear nosepiece 68 is connected with the front nosepiece 64. In other embodiments, each of the slots 88 may contain a switch 92 to detect when the rear nosepiece 68 is connected to and removed from the front nosepiece 64.

With reference to FIG. 3, the spring latch 72 includes a lever 96 pivotably coupled to the front nosepiece 64 and a spring member 100, including spaced pins 103, that is pivotably coupled to the lever 96 in an over-center-type configuration. In turn, the spring member 100 is engageable (via pins 103) with the second pair of projections 84, which are configured as hooks, that extend through respective apertures 102 in the front nosepiece 64. When the lever 96 is pivoted to an over-center position (shown in FIG. 3), the spring member 100 exerts a clamping force against the projections 84, preventing them from being removed from the apertures 102. Accordingly, the rear nosepiece 68 and the magazine 18 are retained to the front nosepiece 64 in an engaged position, as shown in FIGS. 3 and 7. And, when the lever 96 is pivoted downward from the frame of reference of FIG. 3, the spring member 100 releases the clamping force on the projections 84, permitting the spring member 100 to be pivoted away from the front nosepiece 64, and permitting the rear nosepiece 68 (with the attached magazine 18) to be moved in a rearward direction (i.e., toward a disengaged position shown in FIG. 4).

With reference to FIGS. 4-7, the rear nosepiece 68 and magazine 18 move along a first (i.e., rearward) direction 104 when moving toward the disengaged position and along a second (i.e., forward) direction 108 when moving toward the engaged position. The magazine 18 includes a blocking member 112 laterally protruding from a side thereof closest to the housing 14 and battery 60. The blocking member 112 is located between the driving axis 44, which is coaxial with the drive blade 20, and the battery 60 (FIG. 1). As shown in FIGS. 5 and 6, the blocking member 112 protrudes from the magazine 18 by a sufficient amount to overlap a portion of the battery 60. As such, the blocking member 112 acts as a safety mechanism because an operator is required to remove the battery 60 (thereby disconnecting any power to the motor 52) prior to removing the magazine 18 for clearing a jammed fastener 12 from the nosepiece 16. By removing the battery 60, any inadvertent fastening operations are avoided. When the battery 60 remains attached to the handle 56, the blocking member 112 interferes with a shoulder 116 (FIG. 6) of the battery 60 if removal of the magazine 18 from the nosepiece 16 is attempted prior to removing the battery 60. In the engaged position of the rear nosepiece 68 and magazine 18, a gap 120 exists between the shoulder 116 of the battery 60 and the blocking member 112 (FIG. 5). After releasing the latch 72, the rear nosepiece 68 and magazine 18 may be moved in direction 104 until the blocking member 112 abuts the shoulder 116, thereby limiting any further movement of the magazine 18 in direction 104 so long as the battery 60 remains attached to the housing 14. At this point, a gap 124 now exists between the front nosepiece 64 and the rear nosepiece 68. However, at this time, the projections 84 remain within the apertures 102 (FIG. 4), preventing the magazine 18 from being removed as long as the battery 60 remains attached to the housing 14.

Occasionally, a misfire or incomplete fastening operation, resulting in a jam, occurs during operation of the fastener driver 10. That is, the fastener 12 failed to completely eject from the nosepiece 16 into the workpiece. Subsequently, the drive blade 20 is inhibited from moving through its full stroke length due to the fastener 12 blocking the fastener driving track 76. To prevent the operator from attempting to clear the jammed fastener 12 while power is still supplied to the fastener driver 10 by the connected battery 60, removal of the rear nosepiece 68 and the magazine 18 to access the fastener driving track 76 (to clear the jam) first requires removal of the battery 60. After the battery 60 is removed, a fastener driving operation cannot be inadvertently initiated, and the rear nosepiece 68 and magazine 18 can be fully disengaged from the front nosepiece 64 to access the fastener driving track 76 to clear the jam.

Also, due to the presence of the electrical switch 92 in the slot 88 of the front nosepiece 64, the fastener driver 10 will remain deactivated, despite reattachment of the battery 60, until the rear nosepiece 68 and magazine 18 are reattached to the front nosepiece 64. Upon reattachment of the rear nosepiece 68 and magazine 18, the projection 80 contacts and closes the switch 92 (if it is normally open), thereby returning the fastener driver 10 to an active or operational state in which a fastener firing operation may be initiated.

Various features of the invention are set forth in the following claims.

What is claimed is:

1. A fastener driver comprising:
   a housing;
   a cylinder disposed within the housing;
   a piston positioned and moveable within the cylinder;
   a driver blade attached to the piston and movable with the piston;
   a motor for driving movement of the piston;
   a battery removably coupled to the housing for supplying power to the motor;
   a nosepiece at least partially defining a fastener driving track through which fasteners are driven by the driver blade; and
   a magazine operable to supply the fasteners to the nosepiece,
   wherein the magazine is removable from the nosepiece only in response to prior removal of the battery from the housing, wherein the magazine includes a blocking member engageable with the battery to prevent removal of the magazine from the housing when the battery is coupled to the housing.

2. The fastener driver of claim 1, wherein the magazine is removably coupled to the nosepiece independent of whether the battery is coupled to the housing.

3. The fastener driver of claim 1, wherein the nosepiece is a front nosepiece, wherein the fastener driver further comprises a rear nosepiece attached to the magazine, and wherein the fastener driving track is defined between the front nosepiece and the rear nosepiece.

4. The fastener driver of claim 3, further comprising a quick-release latch that is operable to secure the front nosepiece and the rear nosepiece together.

5. The fastener driver of claim 4, wherein the rear nosepiece includes two hooks, respectively, positioned on opposite sides of the fastener driving track, and wherein the quick-release latch is engaged with the hooks to secure the front nosepiece and the rear nosepiece together.

6. The fastener driver of claim 5, wherein the front nosepiece defines respective apertures through which the hooks extend.

7. The fastener driver of claim 6, wherein the quick-release latch includes a lever and a spring pivotably coupled to the lever, wherein the lever is pivotably coupled to the front nosepiece.

8. The fastener driver of claim 7, wherein the quick-release latch further includes spaced pins positioned on a lower end of the spring and engageable with the hooks, respectively, for securing the front nosepiece and the rear nosepiece together.

9. The fastener driver of claim 6, wherein the magazine includes a blocking member located between a driving axis coaxial with the driver blade and the battery, and wherein the blocking member laterally protrudes from a side of the magazine closest to the battery.

10. The fastener driver of claim 9, wherein the blocking member and the battery define a first axial gap in a direction parallel with an insertion axis of the battery when the battery is coupled to the housing to supply power to the motor.

11. The fastener driver of claim 10, wherein the blocking member is engageable with the battery, thereby preventing further movement of the magazine in the direction parallel with the insertion axis, when the quick-release latch is disengaged from the hooks.

12. The fastener driver of claim 11, wherein the rear nosepiece is separable from the front nosepiece by a second axial gap equal to the first axial gap when the blocking member is engaged with the battery.

13. The fastener driver of claim 12, wherein the hooks are at least partially positioned within the respective apertures in the front nosepiece when the rear nosepiece is separated from the front nosepiece by the second axial gap.

14. The fastener driver of claim 3, wherein the rear nosepiece and the magazine are removably coupled to the front nosepiece as a unit.

15. The fastener driver of claim 14, further comprising an electrical switch operable to detect when the rear nosepiece is removed from the front nosepiece.

16. The fastener driver of claim 15, wherein activation of the motor is inhibited in response to the electrical switch detecting removal of the rear nosepiece from the front nosepiece.

17. The fastener driver of claim 16, wherein the electrical switch is coupled to the front nosepiece, and wherein the rear nosepiece includes a projection engageable with the electrical switch when the rear nosepiece is coupled to the front nosepiece.

18. The fastener driver of claim 17, wherein the projection disengages the electrical switch in response to removal of the rear nosepiece from the front nosepiece.

\* \* \* \* \*